US012640528B2

(12) United States Patent
Liu et al.

(10) Patent No.: US 12,640,528 B2
(45) Date of Patent: May 26, 2026

(54) CONNECTOR AND CONNECTOR ASSEMBLY

(71) Applicant: Tyco Electronics (Shanghai) Co., Ltd., Shanghai (CN)

(72) Inventors: Jiaoyong (Mac) Liu, Shanghai (CN); Jie (Roger) Luo, Shunde (CN); Hongqiang (Sean) Han, Shanghai (CN); Rong (Summer) Zhang, Shenzhen (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 400 days.

(21) Appl. No.: 18/314,966

(22) Filed: May 10, 2023

(65) Prior Publication Data

US 2023/0369816 A1 Nov. 16, 2023

(30) Foreign Application Priority Data

May 11, 2022 (CN) ......................... 202210513826.2

(51) Int. Cl.
*H01R 25/14* (2006.01)
*H01R 13/516* (2006.01)
*H01R 13/631* (2006.01)

(52) U.S. Cl.
CPC ........... *H01R 25/14* (2013.01); *H01R 13/516* (2013.01); *H01R 13/6315* (2013.01)

(58) Field of Classification Search
CPC ......... H01R 25/145; H01R 4/28; H01R 24/60
USPC .......................................... 439/110, 189, 190
See application file for complete search history.

(56) References Cited

U.S. PATENT DOCUMENTS 4,174,143 A * 11/1979 Hicks, Jr. ............... H02G 5/007 174/88 B
4,878,862 A * 11/1989 Wise .................... H01R 25/162 439/787
4,981,449 A * 1/1991 Buchter ............... H01R 25/162 174/88 B
4,983,132 A * 1/1991 Weidler ............... H01R 25/162 439/786
5,213,518 A * 5/1993 Weidler ............... H01R 25/162 439/211
5,692,930 A * 12/1997 Garver ................ H01R 4/5091 439/781

(Continued)

FOREIGN PATENT DOCUMENTS

CN 105514692 B 6/2018
CN 112054327 A 12/2020
CN 212257866 U 12/2020

*Primary Examiner* — Harshad C Patel
(74) *Attorney, Agent, or Firm* — Barley Snyder

(57) ABSTRACT

A connector adapted to electrically connect a first bus bar and a second bus bar includes an insulating housing having a first hole and a slot at an end of the insulating housing, a conductive terminal provided within the insulating housing and in electrical contact with the second bus bar inserted into the slot, and a conductive pin inserted into the first hole and electrically connected with the conductive terminal and the first bus bar. The slot extends in the insulating housing in a first direction and a third direction and receives the second bus bar inserted into the slot. The first hole extends at least partially through the insulating housing in a second direction. The conductive pin is slidable in the first hole relative to the conductive terminal in the second direction.

20 Claims, 7 Drawing Sheets

(56) References Cited

U.S. PATENT DOCUMENTS

| | | | | | |
|---|---|---|---|---|---|
| 5,769,652 | A | 6/1998 | Wider | | |
| 6,062,919 | A * | 5/2000 | Trafton | H01R 13/187 | 439/843 |
| 6,489,567 | B2 * | 12/2002 | Zachrai | H02G 5/025 | 174/70 B |
| 6,508,656 | B2 * | 1/2003 | Chevassus-More | H02B 11/04 | 439/721 |
| 7,115,003 | B2 * | 10/2006 | Zhao | H01R 13/187 | 29/869 |
| 7,387,548 | B2 * | 6/2008 | Takehara | H01R 13/187 | 439/856 |
| 8,142,238 | B2 * | 3/2012 | Heigl | H01R 13/187 | 439/843 |
| 11,196,202 | B2 | 12/2021 | Hua et al. | | |
| 2019/0089093 | A1 * | 3/2019 | Liu | H01R 12/7088 | |

* cited by examiner

CONNECTOR AND CONNECTOR ASSEMBLY

CROSS-REFERENCE TO RELATED APPLICATION

This application claims the benefit of the filing date under 35 U.S.C. § 119(a)-(d) of Chinese Patent Application No. 202210513826.2, filed on May 11, 2022.

FIELD OF THE INVENTION

The disclosure relates to a connector and a connector assembly.

BACKGROUND

At present, a connection between a first bus bar and a second bus bar perpendicular to each other is generally performed by a fastening screw in a rigid fit manner. This connection causes the existence of misalignment and tilting in the mating between the second bus bar and the first bus bar. The misalignment and tilting may cause the breakage of the fastening screw, under the conditions of long-term torsional stress, mechanical vibration and the like, thereby causing the disconnection of the whole system.

SUMMARY

A connector adapted to electrically connect a first bus bar and a second bus bar includes an insulating housing having a first hole and a slot at an end of the insulating housing, a conductive terminal provided within the insulating housing and in electrical contact with the second bus bar inserted into the slot, and a conductive pin inserted into the first hole and electrically connected with the conductive terminal and the first bus bar. The slot extends in the insulating housing in a first direction and a third direction and receives the second bus bar inserted into the slot. The first hole extends at least partially through the insulating housing in a second direction. The conductive pin is slidable in the first hole relative to the conductive terminal in the second direction.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
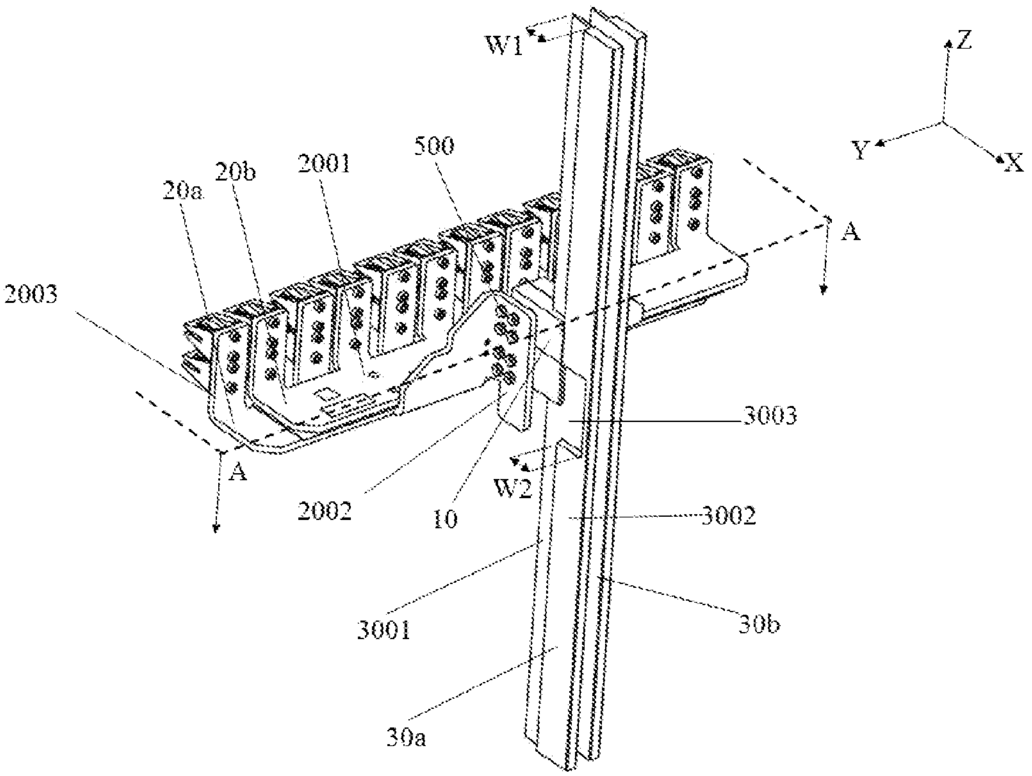
FIG. 1 shows a perspective view of a connector assembly comprising a connector according to the disclosure and a first bus bar and a second bus bar.

Hereinafter, embodiments of the disclosure will be described with reference to the accompanying drawings. The same reference numerals and symbols shown in the drawings of the disclosure refer to elements or components performing substantially the same function.

Furthermore, the terminology used herein is intended to describe the embodiments, and is not intended to limit and/or constrain the disclosure. The singular forms “a”, “an”, “the” and “said” are intended to include the plural forms as well, unless the context clearly dictates otherwise. In the disclosure, the terms such as “include”, “comprise”, “have” and the like, are intended to specify the presence of stated features, number, steps, operations, elements, components and combinations thereof, but do not preclude the presence or addition of one or more other features, number, steps, operations, elements, components and combinations thereof.

Although the terms such as “first”, “second”, “third” and the like are used herein to describe various elements, these elements should not be limited by these terms. These terms are only intended to distinguish one element from another. For example, a first element would be termed a second element, and a second element would be termed a first element, without departing from the scope of the disclosure. The term “and/or” includes a plurality of combinations of the associated items or any one of a plurality of associated items.

In the following detailed description, for convenience of illustration, numerous specific details are set forth in order to provide a thorough understanding of the disclosed embodiments. Obviously, however, one or more embodiments may be embodied without these specific details. In other instances, well-known structures and devices are shown in schematic form in order to simplify the drawings.

A connector is provided in the disclosure, which is adapted to electrically connect a first bus bar and a second bus bar. In the illustrated embodiment, the first bus bar extends in a first direction X and a second direction Y, and the second bus bar extends in the first direction X and a third direction Z, wherein the second direction Y is perpendicular to the first direction X and the third direction Z is perpendicular to the first direction X and the second direction Y.

A connector 10, shown in FIG. 1, adapted to electrically connect a first bus bar 20 and a second bus bar 30 is provided in some embodiments of the disclosure. The connector includes: conductive terminals 200 shown in FIGS. 9 and 10 having holes at one end thereof and contacting portions at the other end thereof, the contacting portions being arranged opposite to each other to form a slot, which extends in the first direction X and the third direction Z and is configured to receive the second bus bar 30 inserted therein; and a conductive pin 400 adapted to be inserted into the hole to be electrically connected with the conductive terminal 200, and adapted to be electrically connected with the first bus bar 20. The conductive pin 400 is slidable in the hole relative to the conductive terminal 200 in the second direction Y.

Figure 11:
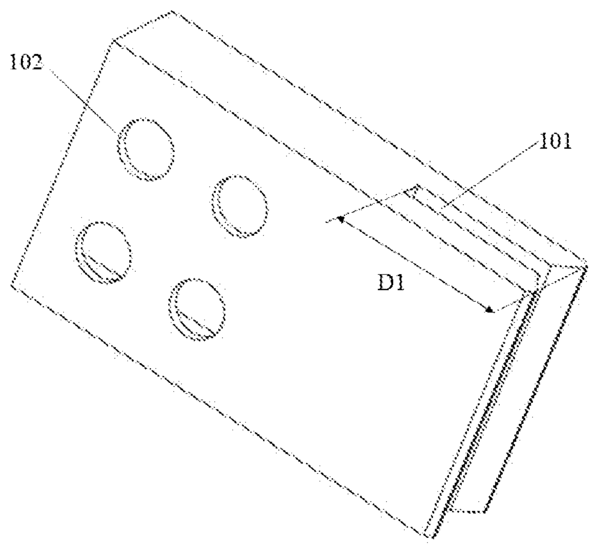
FIG. 11 shows a perspective view of an insulating housing of a connector according to the disclosure.

In other embodiments of the disclosure, the connector 10 may include an insulating housing 100, a conductive terminal 200 and a conductive pin 400. The insulating housing 100 includes a first hole 102 and a slot 101 at one end of the insulating housing 100, as shown in FIG. 11. The slot 101 extends in the insulating housing 100 in the first direction X and the third direction Z and is configured to receive the second bus bar 30 inserted therein. The first hole 102 extends at least partially through the insulating housing 100 in the second direction Y. The conductive terminal 200 is provided in the insulating housing 100 and is adapted to be in electrical contact with the second bus bar 30 inserted into the slot 101. The conductive pin 400 is adapted to be inserted into the first hole 102 to be electrically connected with the conductive terminal 200, and the conductive pin 400 is adapted to be electrically connected with the first bus bar 20.

In some embodiments, the conductive pin 400 is slidable in the first hole 102 relative to the conductive terminal 200 in the second direction Y.

In some embodiments, the conductive terminal 200 is adapted to be in electrical contact with the second bus bar 30 inserted into the slot 101 in a manner that the second bus bar 30 inserted into the slot 101 is slidable in the first direction X and the third direction Z relative to the conductive terminal 200.

Figure 2:
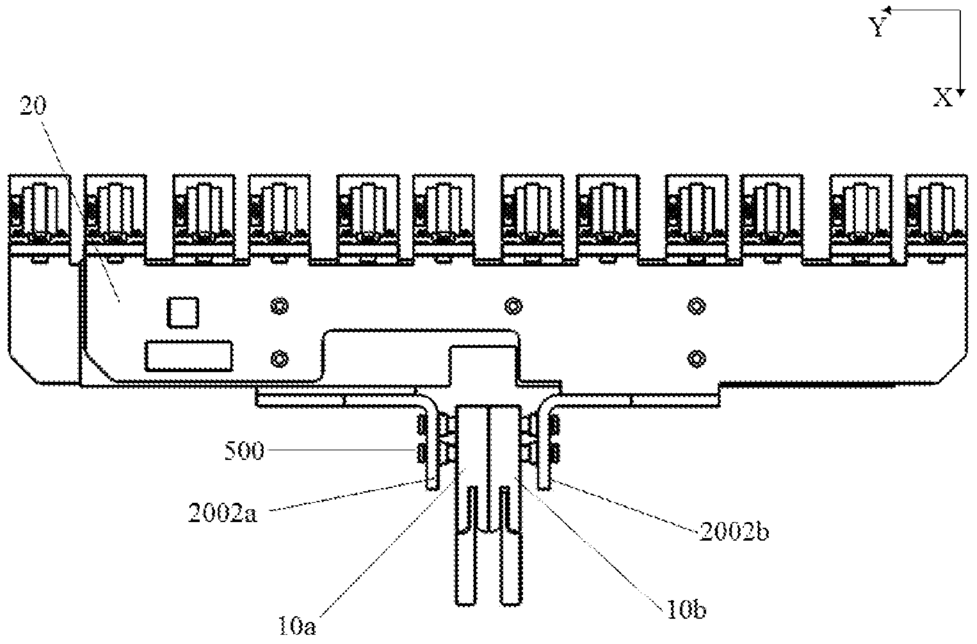
FIG. 2 shows a top view of the connector assembly comprising the connector according to the disclosure and the first bus bar and the second bus bar.
Figure 3:
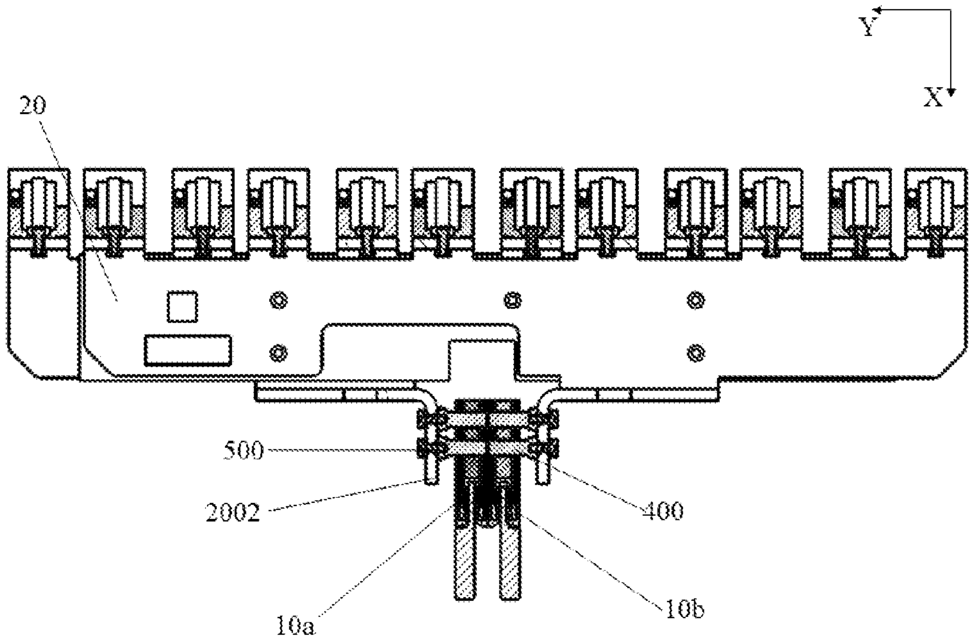
FIG. 3 shows a top cross-sectional view of the connector assembly comprising the connector according to the disclosure and the first bus bar and the second bus bar, taken along line A-A in FIG. 1.

FIG. 1 shows a perspective view of a connector assembly comprising a connector 10 according to the disclosure and a first bus bar 20 and a second bus bar 30. FIG. 2 shows a top view of the connector assembly comprising the connector 10 according to the disclosure and the first bus bar 20 and the second bus bar 30. FIG. 3 shows a top cross-sectional view of the connector assembly comprising the connector 10 according to the disclosure and the first bus bar 20 and the second bus bar 30, taken along line A-A in FIG. 1.

The connector assembly according to the disclosure includes a connector 10, a first bus bar 20, and a second bus bar 30. The first bus bar 20 is adapted to be electrically connected with the conductive pin 400 of the connector. The second bus bar 30 is adapted to be inserted into the slot 101 of the insulating housing 100 of the connector so as to be electrically connected with the conductive terminal 200. The conductive pin 400 is slidable in the first hole 102 relative to the insulating housing in a second direction Y so as to allow the connector 10 to move relative to the first bus bar 20 in the second direction Y; and/or the connector 10 is electrically connected with the second bus bar 30 in a manner that the second bus bar is able to slide in the slot 101 in the first direction X and the third direction Z.

As best shown in FIGS. 1 to 3, the connector 10 is electrically connected with the first bus bars 20*a*, 20*b*, which may also be referred to as horizontal bus bars, in a movable manner in the second direction Y. The connector 10 is electrically connected with the second bus bars 30*a*, 30*b*, which may also be referred to as vertical bus bars, in a movable manner in the first direction X and the third direction Z. It should be noted that directional terms such as "horizontal" and "vertical" in the disclosure are described with reference to the orientation shown in FIG. 1, which do not limit actual installation orientations of the connector and the connector assembly of the disclosure.

The first bus bar 20 includes a first body portion 2001 provided with a plurality of connection terminals 2003, and a connection portion 2002 extending from the first body portion 2001, wherein the connection portion 2002 is adapted to be electrically connected with the conductive pin 400.

As shown in FIG. 1, the first body portion 2001 of the first bus bar extends mainly in the second direction Y. A first body portion 2001 of one first bus bar 20*a* for connecting to a positive pole of a power supply and a first body portion 2001 of the other first bus bar 20*b* for connecting to a negative pole of the power supply may be stacked. In an embodiment, the first body portions 2001 of the two first bus bars 20*a*, 20*b* are separated from each other by an insulator.

In addition, the first bus bars 20*a*, 20*b* further have a plurality of connection terminals 2003 adapted to be connected with a supply terminal or an output terminal of the power supply, and the connection terminals 2003 are provided on the first body portion 2001. The connection terminals 2003 may be electrically and fixedly connected with the supply terminal or the output terminal of the power supply by a screw.

Moreover, the first bus bar 20 further includes the connection portion 2002 extending from the first body portion 2001. In the illustrated embodiments, the connection portion 2002 extends in the first direction X and the third direction Z. In the conventional arts, the connection portion 2002 of the first bus bar 20 is electrically and fixedly connected by a screw with the second bus bar extending in the first direction X and the third direction Z, thereby resulting in the misalignment mating and the tilting mating occur, which will cause cases such as the breakage of the screw under the conditions of long-term torsional stress, mechanical vibration and the like.

In an embodiment of the disclosure, the connection portion 2002 of the first bus bar 20 is adapted to be electrically connected with the conductive pin 400 of the connector 10. The conductive pin 400 is adapted to be inserted into the first hole 102 of the insulating housing 100 to be electrically connected with the conductive terminal 200, and is capable of sliding in the first hole 102 relative to the conductive terminal 200 in the second direction Y. In the illustrated embodiment, the conductive pin 400 is in electrical contact with an elastic terminal 300 of the connector 10 in a slidable manner in the second direction Y, and the elastic terminal 300 applies a clamping force to the conductive pin 400, thereby establishing a stable electrical connection between the elastic terminal 300 and the conductive pin 400.

As shown in FIG. 3, the connection portion 2002 of the first bus bar 20 is detachably fixed to a first head of the conductive pin 400 by a first fastener 500. The first fastener 500 is a threaded fastener, such as a screw. In this case, the first head 401 (shown in FIG. 6) of the conductive pin 400 has a first threaded hole having a female thread adapted to mate with the male thread of the first threaded fastener 500. The conductive pin 400 is detachably fixed to the connection portion 2002 by screwing the first threaded fastener 500 into the connection portion 2002 and the first threaded hole, so that the conductive pin 400 is mechanically and electrically connected to the connection portion 2002. In another embodiment, the connection portion 2002 of the first bus bar 20 may be fixed to the first head 401 of the conductive pin 400 by welding.

In the illustrated embodiments, the connector assembly includes two first bus bars 20*a*, 20*b*, of which the first body portions 2001 are provided in a stacked manner in the third direction Z, and an insulator is provided between the two stacked first body portions 2001. The connector assembly includes two connectors 10 positioned between the connection portions of the two first bus bars 20_a_, 20_b_, and each connector 10 is electrically connected with a corresponding one of the first bus bars 20_a_, 20_b_. The connector assembly further includes two second bus bars 30_a_, 30_b_, which are electrically connected with the two first bus bars 20_a_, 20_b_ via the two connectors 10, respectively. The connection portion 2002 of the first bus bar 20_a_ and the connection portion of the other first bus bar 20_b_ sandwich the two connectors 10_a_, 10_b_, so that the conductive pins 400 of the connectors 10 do not disengage from the connectors 10 even though the conductive pins 400 is movably inserted into the connectors 10.

In another embodiment, the first bus bar 20_a_ and the other first bus bar 20_b_ are separately provided, and the two connectors 10 are also separately provided. In this case, a second threaded hole is provided at the other end of the conductive pin 400 opposite to the first head 401 so as to allow a second threaded fastener to be screwed into the second threaded hole, the second head of the second threaded fastener having a diameter larger than that of the first hole 102 extending through the insulating housing, so that the insulating housing 100 can slide in the second direction Y along the rod 402 between the second head of the second threaded fastener and the first head 401 of the conductive pin 400, and the conductive pin 400 does not disengage from the connector 10.

As best shown in FIGS. 1 to 3, the connector 10 is electrically connected with the second bus bars 30_a_, 30_b_ in a movable manner in the first direction X and the third direction Z by the slot 101 at one end of the connector 10. The second bus bar 30_a_, 30_b_ has a contacting portion 3001 adapted to be electrically connected with the conductive terminal 200 of the connector 10, a length of the contacting portion 3001 in the third direction Z being larger than that of the connector 10 in the third direction.

Figure 4:
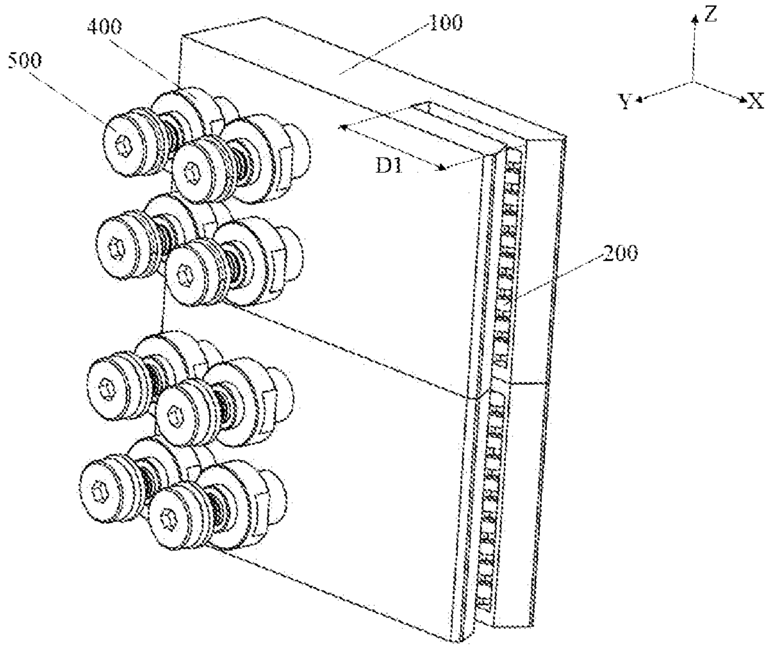
FIG. 4 shows a perspective view of a connector according to the disclosure.

In one embodiment, a width W1 of the contacting portion 3001 in the first direction X (as shown in FIG. 1) is larger than a depth D1 of the slot 101 of the connector 10 in the first direction X (as shown in FIG. 4), so that the connector 10 can move in the first direction X and/or the third direction Z relative to the second bus bar 30 in a state where the connector 10 is electrically connected with the second bus bar 30.

In the illustrated embodiments, the second bus bar 30_a_, 30_b_ further has a second body portion 3002, and a thickness of the second body portion 3002 is larger than a thickness of the contacting portion 3001, so that the second bus bar has sufficient rigidity and thus is not easily bent.

In other embodiments, the width W1 of the contacting portion 3001 in the first direction X is less than or equal to the depth D1 of the slot 101 in the first direction X, or the second bus bar does not have the contacting portion 3001. A recess 3003, shown in FIG. 1, is provided in the second body portion 3002, and the recess 3003 may be opening into or communicating with the contacting portion 3001. A thickness of the recess 3003 in the second direction Y is equal to a thickness of the contacting portion 3001, and a length of the recess 3003 in the third direction Z is larger than a length of the connector 10 in the third direction Z. The recess 3003 has a width W2 in the first direction X, so that the connector 10 can move in the first direction X and/or the third direction Z relative to the second bus bar 30.

Figure 5:
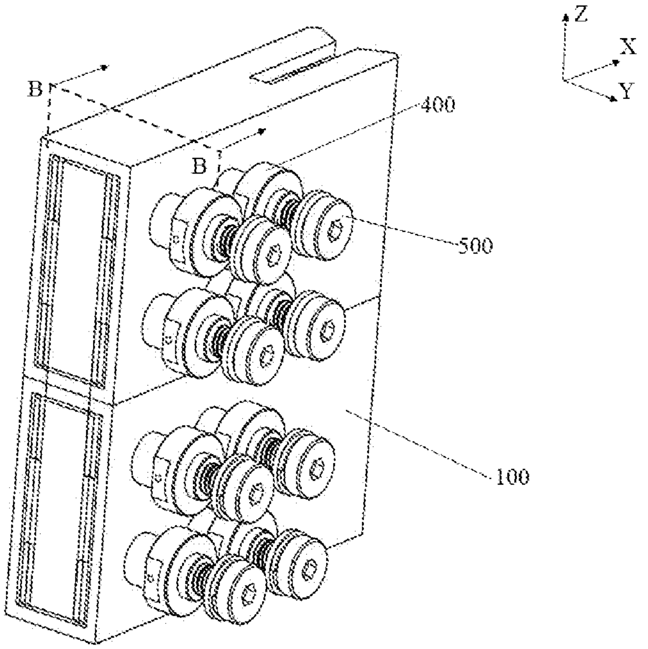
FIG. 5 shows a perspective view of the connector according to the disclosure seen from the rear.
Figure 6:
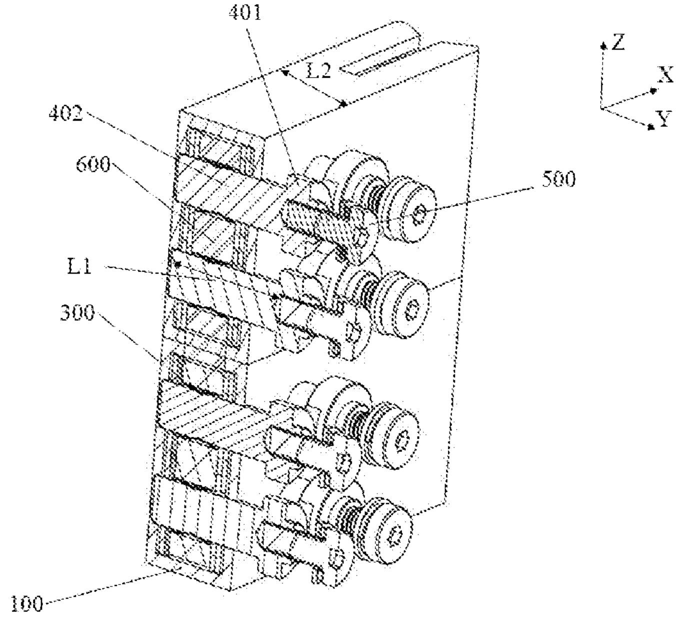
FIG. 6 shows a cross-sectional perspective view of the connector according to the disclosure, taken along the line B-B in FIG. 5.
Figure 7:
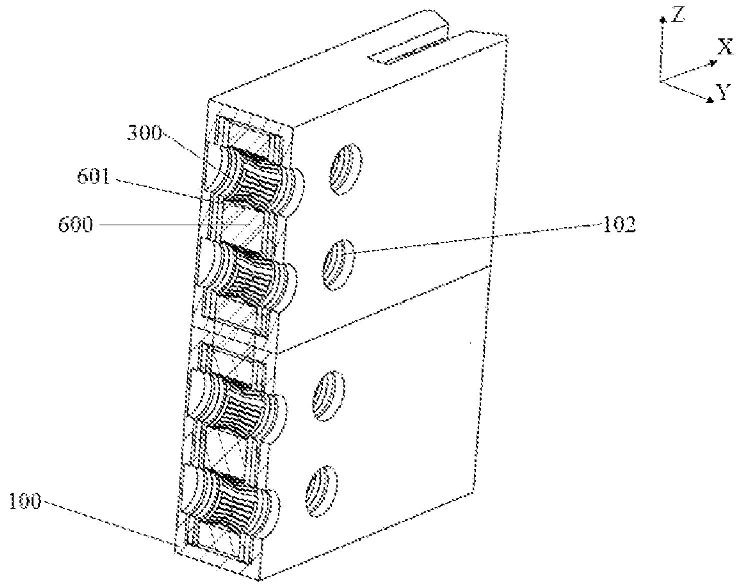
FIG. 7 shows a cross-sectional perspective view of the connector shown in FIG. 6 with the conductive pin removed.
Figure 8:
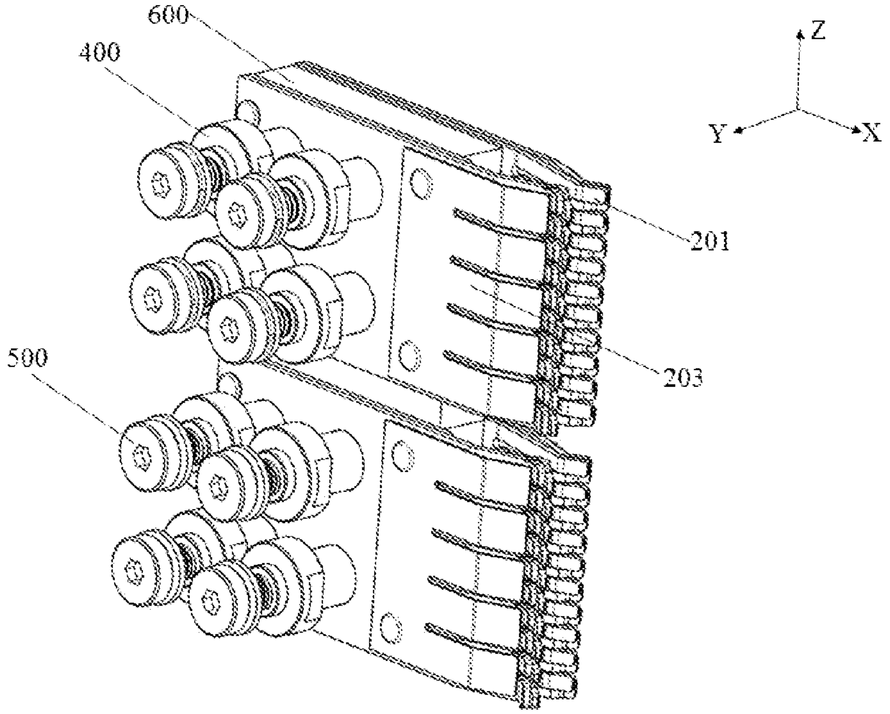
FIG. 8 shows a perspective view of the connector of FIG. 4 with the insulating housing removed.
Figure 9:
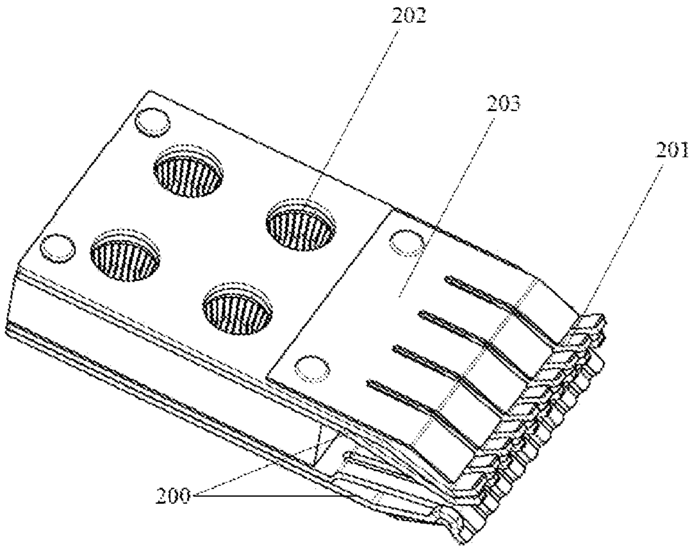
FIG. 9 shows a perspective view of a connector according to another embodiment of the disclosure with the insulating housing removed.
Figure 10:
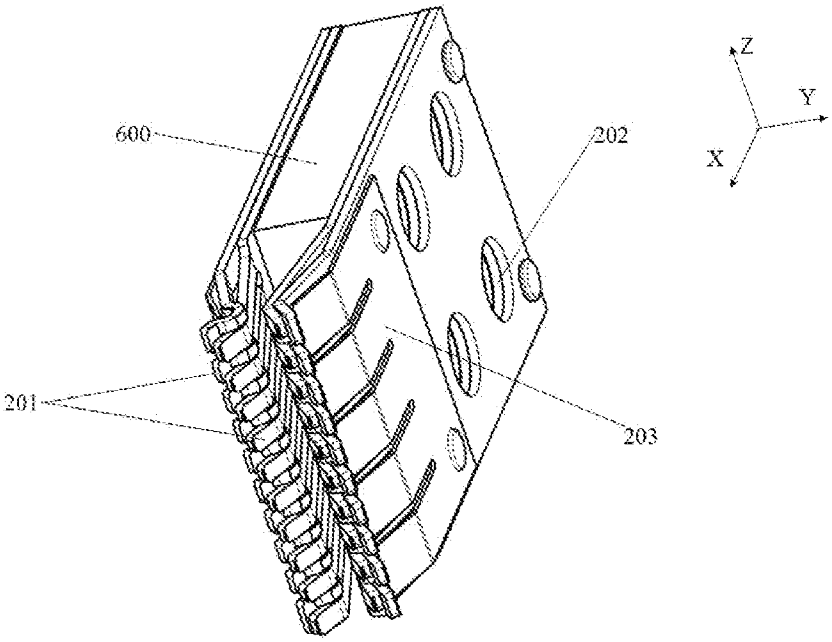
FIG. 10 shows another perspective view of the connector according to another embodiment of the disclosure with the insulating housing removed.

The structure of the connector 10 according to the disclosure is specifically described below with reference to FIGS. 4 to 11. FIG. 4 shows a perspective view of a connector according to the disclosure. FIG. 5 shows a perspective view of a connector according to the disclosure seen from the rear. FIG. 6 shows a cross-sectional perspective view of the connector according to the disclosure, taken along the line B-B in FIG. 5. FIG. 7 shows a cross-sectional perspective view of the connector shown in FIG. 6 with the conductive pin removed. FIG. 8 shows a perspective view of the connector of FIG. 4 with the insulating housing removed. FIG. 9 shows a perspective view of a connector according to another embodiment of the disclosure with the insulating housing removed. FIG. 10 shows another perspective view of the connector according to another embodiment of the disclosure with the insulating housing removed. FIG. 11 shows a perspective view of an insulating housing of a connector according to the disclosure.

As shown in FIGS. 1 to 11, the connector according to the disclosure may include the insulating housing 100, the conductive terminal 200, the conductive pin 400, and an optional elastic terminal 300 and an optional conductive block 600.

The insulating housing 100 is made of an insulating material, such as plastic. As shown in FIG. 11, the insulating housing includes the slot 101 at one end of the insulating housing and the first hole 102.

The slot 101 extends in the insulating housing in the first direction X and the third direction Z and is configured to receive the second bus bar 30 inserted therein. In the illustrated embodiments, the slot 101 extends throughout the insulating housing 100 in the third direction Z, so that the second bus bar 30, which is longer than the connector 10, may be inserted into the connector 10. In another embodiment, the slot 101 does not extend throughout the insulating housing 100 in the third direction Z, and in this case, the second bus bar 30, which is shorter than the connector 10, may be inserted into the connector 10, that is, the length of the second bus bar 30 in the third direction Z is smaller than that of the slot 101 of the connector in the third direction Z. In these cases, the second bus bar 30 inserted into the slot can move in the slot 101 in the first direction X and the third direction Z.

The first hole 102 of the insulating housing 100 extends at least partially through the insulating housing 100 in the second direction Y. The rod 402 (shown in FIG. 6) of the conductive pin 400 of the connector can be inserted into the first hole 102. In the illustrated embodiments, the number of the first holes 102 is four, but the number of the first holes 102 may be one, two, or more, which is not limited in the disclosure.

In the embodiment shown, the first hole 102 of the insulating housing 100 extends throughout the insulating housing 100 so that the conductive pin 400 can be inserted from either side. In a state where the connector 10 and the second bus bar 30_a_, 30_b_ are assembled together as shown in FIG. 1, two adjacent sidewalls of the insulating housings 100 of two adjacent connectors 10 are isolated from each other by an insulator so as to prevent electrical contact between two conductive pins 400 opposite to each other.

Alternatively, the first hole 102 of the insulating housing 100 extends throughout one of two sidewalls of the insulating housing 100 and does not extend throughout the other sidewall so as to prevent electrical contact between the conductive pins 400 opposite to each other.

The connector 10 includes the conductive terminal 200 provided within the insulating housing 100 and adapted to be electrically connected with the second bus bar 30 in a movable manner. That is, the conductive terminal 200 is in electrical contact with the second bus bar 30 inserted into the slot 101 in a manner that the second bus bar is insertable into the slot in a slidable manner in the first direction X and the third direction Z relative to the conductive terminal 200.

The conductive terminal 200 is provided with a third hole 202, shown in FIGS. 9 and 10, which is aligned with the first hole 102 of the insulating housing 100 and the second hole 601 of the conductive block 600 in the second direction Y, so that the conductive pin 400 is adapted to be slidably inserted into the first hole 102, the second hole 601 and the third hole 202. The number, size and position of the third holes 202 correspond to those of the first holes 102 of the insulating housing 100, respectively.

The conductive terminal 200 further includes a plurality of elastic arms 201 adapted to be slidably pressed against the second bus bar 30 inserted into the slot.

In the illustrated embodiment, the connector 10 includes a pair of conductive terminals 200 arranged to clamp two opposite sides of the second bus bar 30 inserted into the slot 101; or opposite conductive terminals 200 are provided on inner sides of both side walls of the slot 101 of the insulating housing 100 of the connector, respectively, the opposite conductive terminals 200 slidably clamping the second bus bar 30 and being able to be electrically connected with the second bus bar 30.

As best shown in FIGS. 8-10, a plurality of elastic arms 201 of one of the pair of conductive terminals 200 are staggered with respect to a plurality of elastic arms 201 of the other of the conductive terminals 200 in the third direction Z. Further, as shown in figures, two conductive terminals 200 are provided in a stacked manner in the second direction Y on each side of the conductive block 600, and the plurality of elastic arms 201 of one of the two conductive terminals 200 on either side of the conductive block 600 are also staggered with respect to the plurality of elastic arms 201 of the other of the conductive terminals 200 in the third direction Z.

In another embodiment, the conductive terminal 200 is provided on one of two sidewalls of the slot 101 of the insulating housing 100, and no conductive terminal is provided on the other sidewall. In this case, the elastic arm 201 of the conductive terminal 200 slidably clamps the second bus bar 30 together with the sidewall, so that the elastic arm 201 of the conductive terminal 200 establishes an electrical connection with the clamped second bus bar 30.

In an embodiment, the elastic arm 201 of the conductive terminal 200 is covered with a reinforcing plate 203, shown in FIGS. 8-10, so that the clamping force for clamping the second bus bar 30 applied by the elastic arm 201 of the conductive terminal 200 together with the opposite other elastic arm or the sidewall can be further reinforced.

As best shown in FIGS. 7 and 9, the connector further includes an elastic terminal 300 being capable of conducting electricity, the elastic terminal 300 being electrically connected with the conductive terminal 200. In the illustrated embodiments, the elastic terminal 300 is provided on a wall of the second hole 601 of the conductive block 600, and thus is electrically connected with the conductive block 600 and the conductive terminal 200. The conductive terminal 200 is adapted to be in electrical contact with the conductive pin 400 in a slidable manner in the second direction Y. The elastic terminal 300 has elasticity, thereby applying a clamping force to the conductive pin 400 so that the elastic terminal 300 can be in close contact with the rod 402 of the conductive pin 400 in a circumferential direction, thereby establishing the stable electrical connection.

In an embodiment, the connector includes the conductive block 600, which is capable of supporting the conductive terminal 200 and the elastic terminal 300. The conductive block 600 is clamped between the conductive terminals 200 oppositely provided and establishes the stable electrical connection with the conductive terminals 200.

The conductive block 600 may be made of a single metal plate or alloy plate, or may be made of a plurality of metal sheets laminated together. The plurality of metal sheets may be made of the same metal, for example, copper. In another embodiment, the plurality of metal sheets may be composed of different metal sheets, for example, copper sheets and aluminum sheets arranged alternately, thereby reducing costs.

Second holes 601 are provided in the conductive block 600, and the number, size and position of the second holes 601 correspond to those of the third holes 202 of the conductive terminals 200 and of the first holes 102 of the insulating housing 100, respectively, so that the rod 402 of the conductive pins 400 of the connector can be inserted into the second holes 601. The elastic terminal 300 can be attached to the wall of the second hole of the conductive block 600. Therefore, the conductive block 600 stably supports the elastic terminal 300 and establishes the stable electrical connection with the elastic terminal 300.

A length of the conductive block 600 in the third direction Z is larger than the lengths of the insulating housing 100 and the conductive terminals 200 in the third direction Z, so that at least two conductive terminals 200 are arranged on a surface of the conductive block 600 in the third direction Z.

As best shown in FIG. 6, the conductive pin 400 of the connector has the first head 401 and the rod 402. The conductive pin 400 is adapted to be connected to the connection portion 2002 of the first bus bar 20 at the first head 401, the first head 401 having a diameter larger than that of the first hole 101 of the insulating housing 100. The rod 402 is adapted to be slidably inserted into the first hole 102. The rod 402 has a smooth surface so as to be in contact with the elastic terminal 300 in a slidable manner and establish the stable electrical connection.

In the illustrated embodiment, the first head 401 of the conductive pin 400 has a threaded hole having a female thread adapted to mate with the male thread of the first threaded fastener 500. The connection portion 2002 of the first bus bar is fixed to the first head 401 of the conductive pin 400 by the first threaded fastener 500, thereby establishing the stable electrical connection between the first bus bar 20 and the conductive pin 400 and between the first bus bar 20 and the conductive terminal 200 of the connector. In another embodiment, the connection portion 2002 of the first bus bar is fixed to the first head 401 of the conductive pin 400 by soldering or welding.

A length L1 of the rod 402 of the conductive pin 400 in the second direction Y is larger than or equal to a thickness L2 of the connector 10 in the second direction Y. When the conductive pin 400 is inserted into the body of the connector 10, the rod 402 of the conductive pin 400 can be in sufficient contact with the elastic terminal 300 to establish the stable electrical connection.

In another embodiment, a second threaded hole is provided at the other end of the conductive pin 400 opposite to the first head 401 so as to allow the second threaded fastener to be screwed into the second threaded hole, the second head of the second threaded fastener having a diameter larger than that of the first hole 102 extending through the insulating housing, so that the insulating housing can slide in the second direction Y along the rod 402 between the second head of the second threaded fastener and the first head 401 of the conductive pin 400, thereby preventing the conductive pin 400 from disengaging from the connector 10.

The connectors 10 provided according to various embodiments of the disclosure are adapted to electrically connect the first bus bar 20 and the second bus bar 30. The connector includes an insulating housing 100 including the slot 101 at one end of the insulating housing and the first hole 102, the slot 101 extending in the insulating housing in the first direction X and the third direction Z and configured to receive the second bus bar 30 inserted therein, the first hole 102 extending at least partially through the insulating housing 100 in the second direction Y, wherein the second direction Y is perpendicular to the first direction X and the third direction Z is perpendicular to the first direction X and the second direction Y. The connector 10 includes the conductive terminal 200 provided within the insulating housing 100 and adapted to be in electrical contact with the second bus bar 30 inserted into the slot 101. The connector 10 further includes the conductive pin 400 adapted to be inserted into the first hole 102 to be electrically connected with the conductive terminal 200, and adapted to be electrically connected with the first bus bar 20. The conductive pin 400 is slidable in the first hole 102 in the second direction Y relative to the conductive terminal 200, and/or the conductive terminal 200 is adapted to be in electrical contact with the second bus bar 30 inserted into the slot 101 in a manner that the second bus bar 30 inserted into the slot 101 is allowed to be slidable in the first direction X and the third direction Z relative to the conductive terminal 200.

As such, the connector 10 according to the disclosure is not only capable of establishing the stable electrical connection with the first bus bar 20 and the second bus bar 30, but also the connector 10 is capable of sliding relative to the first bus bar 20 in the second direction Y, so that the connector establishes a throughout floating electrical contact with the first bus bar; and the connector 10 is slidable relative to the second bus bar 30 in the first direction X and the third direction Z so that the connector establishes a separable and pluggable floating electrical contact with the second bus bar. Therefore it eliminates the torsional stress caused by the misalignment mating and the tilting mating, and thus the risk of disconnection caused by the breakage of a screw due to the stress.

Although various embodiments of the disclosure have been shown and described, it will be understood by those skilled in the art that changes may be made to these embodiments without departing from the principles and spirit of the disclosure, the scope of which is defined by the appended claims and the equivalents thereof.

What is claimed is:

1. A connector adapted to electrically connect a first bus bar and a second bus bar, comprising:

an insulating housing having a first hole and a slot at an end of the insulating housing, the slot extending in the insulating housing in a first direction and a third direction and receiving the second bus bar inserted into the slot, the first hole extending at least partially through the insulating housing in a second direction, the second direction is perpendicular to the first direction and the third direction is perpendicular to the first direction and the second direction;

a conductive terminal provided within the insulating housing and in electrical contact with the second bus bar inserted into the slot; and a conductive pin inserted into the first hole and electrically connected with the conductive terminal and the first bus bar, the conductive pin is slidable in the first hole relative to the conductive terminal in the second direction.

2. The connector according to claim 1, further comprising a conductive block provided within the insulating housing, the conductive terminal is partially supported on a surface of the conductive block, the conductive block has a second hole aligned with the first hole in the second direction so that the conductive pin is slidably inserted into the first hole and the second hole.

3. The connector according to claim 2, wherein the conductive terminal has a third hole aligned with the first hole and the second hole in the second direction so that the conductive pin is slidably inserted into the first hole, the second hole, and the third hole.

4. The connector according to claim 2, further comprising an elastic terminal provided on a wall of the second hole of the conductive block and electrically connected with the conductive terminal, the elastic terminal is in electrical contact with the conductive pin in a slidable manner in the second direction and applies a clamping force to the conductive pin.

5. The connector according to claim 2, wherein a length of the conductive block in the third direction is larger than the insulating housing and the conductive terminal in the third direction so as to allow at least two conductive terminals to be arranged on the surface of the conductive block in the third direction.

6. The connector according to claim 1, wherein the conductive pin has a first head and a rod, the conductive pin is connected to a connection portion of the first bus bar at the first head, the rod is slidably inserted into the first hole.

7. The connector according to claim 6, wherein:

the first head has a first threaded hole allowing the conductive pin to be detachably fixed to the connection portion by screwing a first threaded fastener into the connection portion and the first threaded hole, the conductive pin is mechanically and electrically connected to the connection portion; or the first head is fixed to the connection portion by welding.

8. The connector according to claim 6, wherein a length of the rod in the second direction is larger than or equal to a thickness of the connector in the second direction.

9. The connector according to claim 7, wherein a second threaded hole is provided at an end of the conductive pin opposite to the first head to allow a second threaded fastener to be screwed into the second threaded hole, a second head of the second threaded fastener has a diameter larger than the first hole extending through the insulating housing, the insulating housing is slidable along the rod between the second head of the second threaded fastener and the first head of the conductive pin in the second direction.

10. The connector according to claim 1, wherein the conductive terminal has a plurality of elastic arms slidably pressed against the second bus bar inserted into the slot.

11. The connector according to claim 10, wherein the connector has a pair of conductive terminals clamping a pair of opposite sides of the second bus bar inserted into the slot, the plurality of elastic arms of one of the pair of conductive terminals are staggered with respect to the plurality of elastic arms of the other of the pair of conductive terminals in the third direction.

12. A connector assembly, comprising:

a connector including:

an insulating housing having a first hole and a slot at an end of the insulating housing, the slot extending in the insulating housing in a first direction and a third direction, the first hole extending at least partially through the insulating housing in a second direction, the second direction is perpendicular to the first direction and the third direction is perpendicular to the first direction and the second direction;

a conductive terminal provided within the insulating housing; and a conductive pin inserted into the first hole and electrically connected with the conductive terminal;

a first bus bar electrically connected with the conductive pin of the connector; and a second bus bar inserted into the slot of the insulating housing of the connector and electrically connected with the conductive terminal of the connector, the conductive pin is slidable in the first hole of the insulating housing relative to the insulating housing in the second direction to allow the connector to move relative to the first bus bar in the second direction, and/or the connector is electrically connected with the second bus bar in a manner that the second bus bar is allowed to slide in the slot in the first direction and the third direction.

13. The connector assembly according to claim 12, wherein the first bus bar has a first body portion with a plurality of connection terminals and a connection portion extending from the first body portion, the connection portion is electrically connected with the conductive pin.

14. The connector assembly according to claim 13, wherein the connector assembly has two first bus bars, the first body portions of the two first bus bars are arranged in a stacked manner in the third direction and an insulator is provided between two stacked first body portions, the connector assembly comprises two connectors positioned between the connection portions of the two first bus bars, and each connector is electrically connected with a corresponding one of the two first bus bars, the connector assembly further comprises two second bus bars which are electrically connected with the two first bus bars via the two connectors, respectively.

15. The connector assembly according to claim 14, wherein an insulator is provided between the two connectors to prevent the conductive pins of the two connectors from being in electrical contact with each other.

16. The connector assembly according to claim 13, wherein the connection portion is detachably fixed to a first head of the conductive pin by a first threaded fastener.

17. The connector assembly according to claim 12, wherein the second bus bar has a contacting portion inserted into the slot of the connector and in electrical contact with the conductive terminal in a slidable manner, a length of the contacting portion in the third direction is larger than a length of the connector in the third direction.

18. The connector assembly according to claim 17, wherein the second bus bar further comprises a second body portion, a thickness of the second body portion in the second direction is larger than a thickness of the contacting portion in the second direction and a width of the slot in the second direction, and:

a width of the contacting portion in the first direction is larger than a depth of the slot in the first direction; or the width of the contacting portion in the first direction is less than or equal to the depth of the slot in the first direction, and a recess opening into the contacting portion is provided in the second body portion, a thickness of the recess in the second direction being equal to a thickness of the contacting portion, and a length of the recess in the third direction being larger than a length of the connector in the third direction.

19. A connector adapted to electrically connect a first bus bar and a second bus bar, comprising:

a plurality of conductive terminals having a plurality of holes at one end and a plurality of contacting portions at another end, the contacting portions are arranged opposite to each other to form a slot extending in a first direction and a third direction, the slot receives the second bus bar inserted into the slot; and a conductive pin inserted into one of the holes to be electrically connected with the conductive terminals and the first bus bar, the conductive pin is slidable in the one of the holes relative to the conductive terminals in a second direction, the second direction is perpendicular to the first direction, the third direction is perpendicular to the first direction and the second direction.

20. The connector according to claim 19, further comprising a conductive block, the conductive terminals are partially supported on a pair of side surfaces of the conductive block, the conductive block has a second hole aligned with one of the holes of the conductive terminals in the second direction so that the conductive pin is slidably inserted into the one of the holes of the conductive terminals and the second hole.

* * * * *